United States Patent Office 3,024,010
Patented Mar. 6, 1962

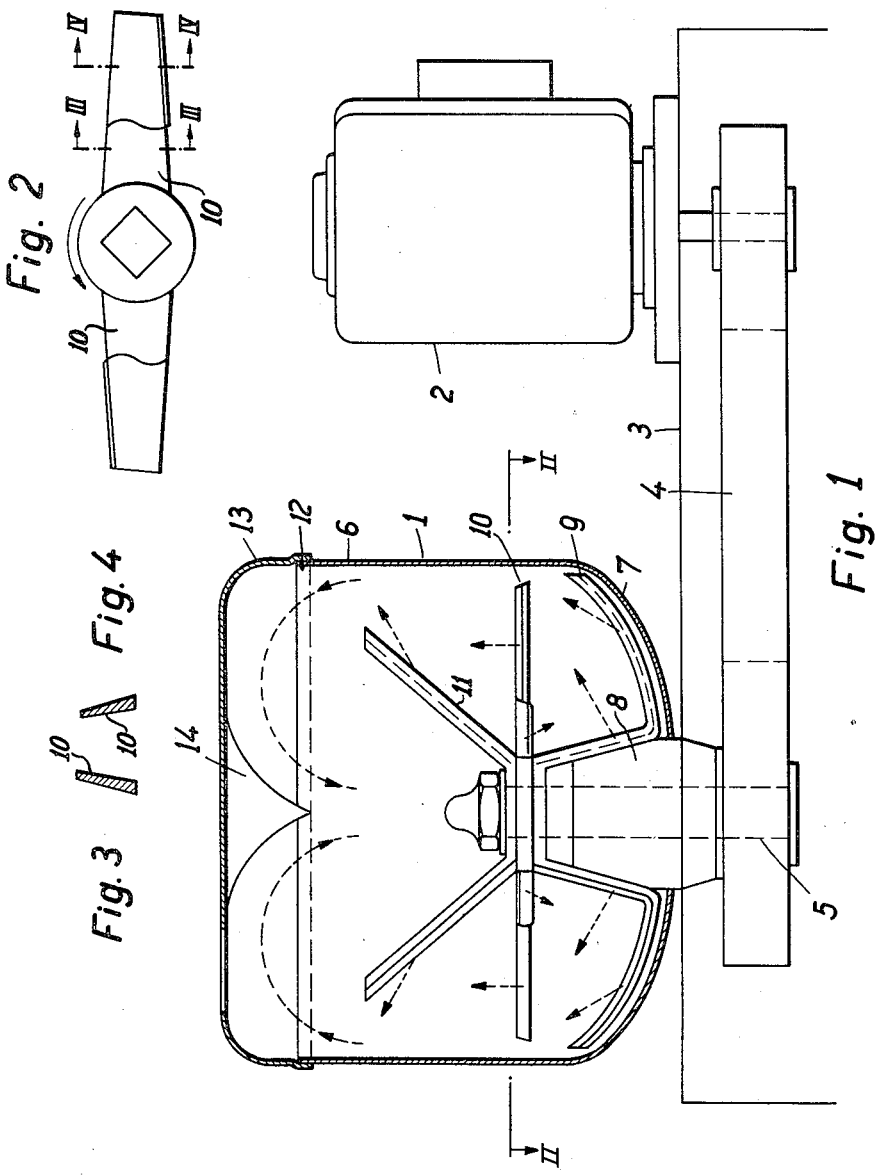

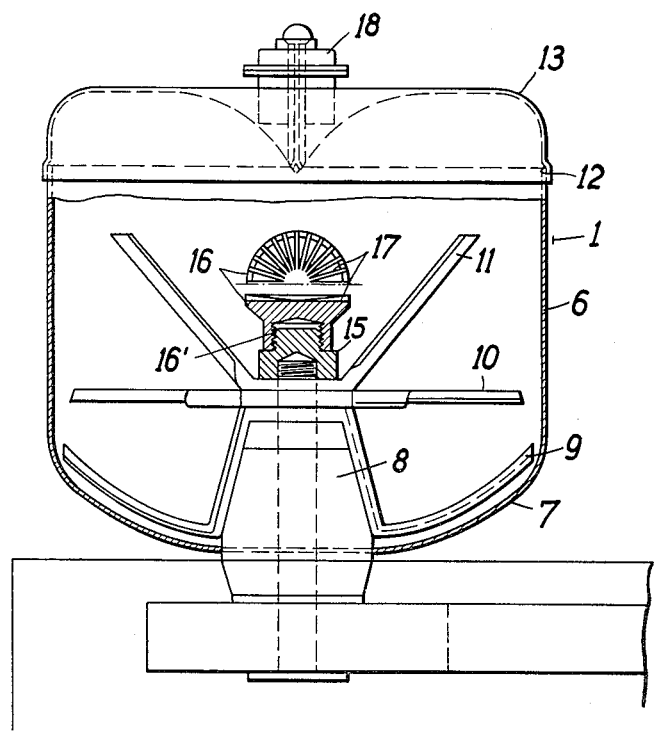

3,024,010
DEVICE FOR MIXING AND AGGLOMERATING PULVERULENT TO GRANULAR MATERIAL
Karl-Heinz Sperling, Osnabruck-Nahne, Germany, assignor to Dierks & Sohne, Osnabruck, Germany, a firm of Germany
Filed Aug. 6, 1959, Ser. No. 832,022
Claims priority, application Germany Aug. 9, 1958
5 Claims. (Cl. 259—107)

The invention relates to a device for the mixing and agglomeration of hot-agglomeratable pulverulent to granular, chemical and pharmaceutical materials, more particularly synthetic plastic materials, to which additives and/or plasticisers can be admixed at the same time.

Mixing devices are known in which the material while being mixed is subjected to mechanically generated heat. Such mixing devices are equipped with a stationary ring of pins and a cooperating rotating ring of pins, the latter being provided with blades of any desired form which extend approximately to the walls of the mixing container.

These devices have the disadvantage that the readiness of the heated individual particles to agglomerate with adjoining particles is nullified when said particles are acted upon by said cooperating rings of pins and thereafter occurs a sudden binding action of all the material situated in the mixer, causing a blocking of the machine. When the mixing device is then emptied, a cake-like mass remains which has to be removed by cutting mills.

Another known mixing device has a blade shaft which is mounted in a hub projecting from the bottom into the mixing container and on which are releasably fixed a set of stirring blades operating in the vicinity of the bottom, and thereabove at least one set of cutting blades and a set of suction blades and at the top a set of head blades.

This last mentioned mixing device like the first-mentioned device has to a greater or less degree the disadvantage that when mixing substances, which tend to become electrostatically charged to a considerable extent, thick layers of raw material are assembled in the upper portion of the mixing chamber and are left outside the mixing operation.

Furthermore, the last-mentioned known mixing device is not suitable for producing adequate energy to effect agglomeration.

My invention has as its object firstly to obviate the above-mentioned disadvantages of depositing the mixed material on the lid and on the upper rim of the container. Furthermore, and this is important, the invention aims at solving the problem of agglomerating the particles of the material being mixed with neighbouring particles without the formation of lumps, thus substantially increasing the bulk weight as compared with the starting product. This last-mentioned problem cannot be solved satisfactorily with any of the known mixing devices.

With the use of high-speed mixers for the production of pre-granulates, the formation of lumps in the product readily occurs and this is to be ascribed to the fact that the greatly heated pulverulent product when there is a considerable addition of plasticiser e.g. in the production of synthetic plastic materials, suddenly binds the plasticiser so strongly that there occurs a sudden overwhelming formation of lumps. This leads to stopping the machine and it is no longer possible to discharge the products in granular form. On the contrary, the product has to be removed from the machine by tedious and difficult work and thereafter comminuted all over again.

A further object of the invention is to provide which obviates the drawbacks of the known machine and permits a considerable saving of time in the processing of the material, a substantial reduction in the running time of the machine and a considerable increase in the output per hour, the granulating operation proceeding continuously and reliably without operational disturbances and without overloading and jamming the machine. Additionally my new machine can be rapidly and completely emptied and easily cleaned.

In the mixing device according to my new invention the material to be mixed and agglomerated is made to travel over a whirling path which follows the course of an 8 with the upper part turned through 90°, the mixing means consisting of a plurality of sets of blades arranged one above the other within a closed mixing chamber, heat being supplied to the particles as they rotate freely about their own axis until, with rising temperature due to the heat caused by friction, neighbouring particles agglomerate and the desired grain size is reached.

It may be expedient to heat the mixing container and/or the blades to supply additional heat to the pulverulent to granular material already heated during the mixing operation by frictional heat caused by the rotating blades. The finally agglomerated material is preferably cooled whilst rotating.

According to the invention my new device comprises in combination the following features:

(a) A substantially cylindrical container having a substantially concaved bottom, through which projects coaxially therewith a conically configurated hub which rotatably supports an upstanding shaft;

(b) Three superimposed sets of blades attached to said shaft within said container to rotate therewith;

(c) The first or lowermost set comprising a plurality of blades each having an inner portion extending downwardly along the conical surface of said hub and an outer portion projecting radially outward to the cylindrical container wall in proximate relation to the concaved bottom;

(d) The said blades of said first set having in the direction of their rotation an angle of attack causing a flow of material away from the hub and upward from the bottom;

(e) The second or intermediate set comprising a plurality of substantially horizontally disposed blades radially extending to short of the cylindrical container wall, each blade of said second set composed of an inner portion having an angle of attack causing a downwardly directed flow of material and of an outer portion having an angle of attack causing an upwardly direct flow of material;

(f) The third or uppermost set comprising a plurality of blades each being upwardly inclined and terminating at a larger distance from the cylindrical container wall than the blades of the second set and having in the direction of their rotation an angle of attack causing a flow of material directed towards the container wall; and (g) A cover enclosing said container, the inner surface of said cover provided with a tapered central portion in the form of a revolutionary surface projecting coaxially into the container.

The uppermost set of blades is expediently so arranged and constructed that lines drawn in prolongation of the blades would approximately intersect the container rim.

Expediently, the container is equipped with a double casing, which can be optionally used for cooling or heating.

Finally, according to my invention there may be fixed on the shaft carrying the blades a spraying dish whereby liquid, more particularly plasticiser, supplied to the dish from above is atomised and is directed outwardly approximately horizontally into the stream of material being treated. Expediently, the upper surface of the spraying dish is provided with ribs forming grooves or channels which are directed radially outwards from the dish centre.

The said and other objects of my invention will be fully understood from the following specification when read with the accompanying drawing in which two embodiments of my new mixing machine are illustrated. In the drawing:

FIG. 1 is a diagrammatic vertical central sectional view through one embodiment of the mixing device, FIG. 2 is a plan view of a set of mixing blades as seen in direction of arrows II in FIG. 1, FIG. 3 is a sectional view on the line III—III of FIG. 2, FIG. 4 is a sectional view taken on the line IV—IV of FIG. 2, FIG. 5 shows a vertical sectional view of another embodiment of a device according to the invention.

In FIGS. 1–4 of the drawings, the mixing machine as a whole is designated as 1, the driving motor, which is preferably infinitely adjustable, as 2 and the base on which the mixing machine and motor are arranged as 3. The driving motor 2 drives the shaft 5 of the mixing machine by means of a belt 4. The container 6 has a downwardly curved bottom 7 which comprises an upwardly projecting conical extension 8 which serves to mount the shaft 5. Directly above the cone 8 there is releasably fixed on the shaft 5 a first set of bottom blades 9 which is constructed so that the blades are spaced at constant distances from the cone 8 and the container bottom 7 and reach approximately as far as the container wall. The bottom blades are set at such an angle of attack that the material lying on the bottom 7 is thrown obliquely outwards towards the wall of the container 6 by the blade portion extending parallel to the cone 8 and upwardly by the blade portion arranged above the container bottom as indicated by the dotted arrows.

Provided above the first set of bottom blades is a second or intermediate set of blades 10 which extend horizontally almost as far as the wall of the container 6 and which are so set over approximately two-thirds of their length, measured from the outside, that they throw the material upwards whereas the remainder of the length of the blades is so set that it pulls the material downwards as indicated by the dotted arrows.

Provided above the second set of blades is a third set of upper blades 11 which are directed outwardly and upwardly at an inclination. The blades of the uppermost third set have such an angle of attack that the material is forced outwards towards the container wall. The inclination at which the blades of the uppermost set 11 are arranged is so selected that imaginary lines drawn in prolongation of the blades would approximately intersect the upper rim 12 of the container 6.

The container 6 can be closed by a lid 13 which comprises centrally a conical portion 14 which projects into the container 6. This portion, however, may also be constructed as some other body of revolution.

The operation of the mixing device will be described hereinafter:

The upwardly directed flow of material produced by the set of bottom blades 9 is first of all broken up by the set of central blades 10 but is again established as it is directed outwardly and upwardly at an inclination by the outer blade portion, whereas the oppositely directed inner blade portion produces a downward direction of movement of the material. The set of upper blades 11 describes a truncated cone situated with its narrow end downwards. The upper set of blades 11 by virtue of its angle of attack, diverts the upwardly directed flow of material against the container wall so that said material passes at a high speed through the annular passage between the rotating blades 11 and the container wall, and is thrown against the tightly closed container lid.

Within the upper portion of the flow of the material in the container 1 arises a circular vortex into which the product will enter, assisted by the deflection to which it is subjected by the conical projection 14 on the lid.

The entry of the product into the vortex is also assisted by the horizontal blades 10 which with their inner portion suck the material downwards. Thereupon, the material is supplied to the bottom blades 9, and is here again forced outwardly and upwardly as previously described, thus producing an absolutely uniform mixture. The continual supply of mechanical energy produced by the friction of the sets of blades heat the free-travelling particles of material from the outside until the temperature has risen to such an extent that they combine with neighbouring particles and in the further course of the mixing operation form an agglomerate.

The angles of attack of the sets of blades and also their rotational speed will depend on the bulk weight of the product.

In order to accelerate the agglomeration of the particles the container and/or the sets of blades may be additionally heated. It may happen that cooling is desirable, and in this case a cooled medium instead of a heating medium may be sent through the jacket of the double-walled container 1.

The device according to FIG. 5 differs from the device according to FIGS. 1 to 4 by a nut 15 which is screwed on to the end of the shaft 5 and on to which is attached by threading 16' a spraying dish 16. Provided on the substantially horizontally arranged surface of the spraying dish are rib-like projections 17 which leave intermediate channels directed outwardly from the centre of the dish. The liquid e.g. a plasticiser which is to be introduced into the material is fed from above in axial direction by means of a feed device 18 mounted in the lid 13.

The spraying dish according to FIG. 5 is particularly advantageous in the case of a mixing machine according to FIGS. 1 to 4, but can also be used with advantage in highspeed mixers of other constructions.

In the device according to FIG. 5, the spraying dish atomises the liquid supplied to the spraying dish into fine droplets which are conveyed outwardly into the stream of material so that each individual particle of material is wetted suddenly. Consequently, the gelling takes place at such a high speed that after the plasticisers have been introduced, which takes only a few seconds, all the particles of material are completely gelled and can be discharged from the machine. Lump formation is thus avoided.

While specific embodiments of my invention have been shown and described in detail to illustrate the application of the principles of my invention, it will be well understood that the same may be otherwise embodied without departing from such principles and without avoiding the scope of the appended claims.

What I claim as my invention is:

1. In an apparatus for mixing and agglomerating pulverulent to granular material the improvement comprising in combination a substantially cylindrical container having a substantially concaved bottom; a conically configurated hub projecting through said bottom into said container coaxially therewith; an upstanding shaft rotatably mounted in said hub and passing therethrough; three superimposed sets of blades attached to said shaft within said container to rotate therewith, the first or lowermost set comprising a plurality of blades each having an inner portion extending downwardly along the conical surface of said hub and an outer portion projecting radially outward to the cylindrical container wall in proximate relation to the concaved bottom; the said blades of said first set having in the direction of their rotation an angle of attack causing a flow of material away from the hub and upward from the bottom; the second or intermediate set comprising a plurality of substantially horizontally disposed blades radially extending to short of the cylindrical container wall; each blade of said second set composed of an inner portion having an angle of attack causing a downwardly directed flow of material and of an outer portion having an angle of attack causing an upwardly directed flow of material; the third or uppermost set comprising a plurality of blades each being upwardly inclined and terminating at a larger distance from the cylindrical container wall than the blades of the second set; said blades of the third set having in the direction of their rotation an angle of attack causing a flow of material directed towards the container wall; and a cover enclosing said container, the inner surface of said cover provided with a tapered central portion in the form of a revolutionary surface projecting coaxially into the container.

2. The mixing device according to claim 1 wherein the upwardly inclined blades terminate at such a distance from the container wall that the free cross section of the passage between the circle described by the free end of the rotating blades and the container wall is less than one third of the cross sectional area of the container.

3. The mixing device according to claim 1 wherein the upper set of blades is so arranged and constructed that lines drawn in prolongation of the blades would approximately intersect the container rim.

4. The mixing device of claim 1 comprising a spraying dish for receiving liquid for atomization in the container, said dish associated with and rotating with said shaft, and orifice means associated with the central portion of said cover for delivering liquid gravimetrically to said dish in said container.

5. The mixing device according to claim 4 wherein the spraying dish is provided with a substantially horizontal upper surface and grooves or channels in said surface directed radially outwards from the dish center.

References Cited in the file of this patent

UNITED STATES PATENTS

| | | |
|---|---|---|
| 611,432 | Katzenstein | Sept. 27, 1898 |
| 1,772,898 | Jensen | Aug. 12, 1930 |
| 2,212,260 | Brothman | Aug. 20, 1940 |
| 2,501,467 | Ittner | Mar. 21, 1950 |
| 2,641,412 | Byberg | June 9, 1953 |
| 2,771,111 | Seyfreid | Nov. 20, 1956 |
| 2,861,784 | Masek et al. | Nov. 25, 1958 |
| 2,887,305 | Van Ginneken | May 19, 1959 |

FOREIGN PATENTS

| | | |
|---|---|---|
| 1,153,907 | France | Oct. 21, 1957 |